April 21, 1925.  1,534,083
R. SARDESON
APPARATUS FOR RELINING MOTOR VEHICLE BRAKE BANDS
Original Filed Nov. 25, 1921   2 Sheets-Sheet 1
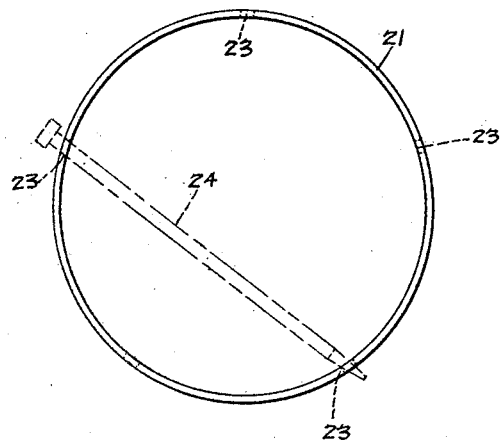
FIG. 1
FIG. 3
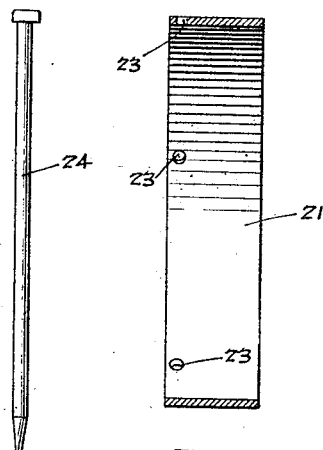
FIG. 2
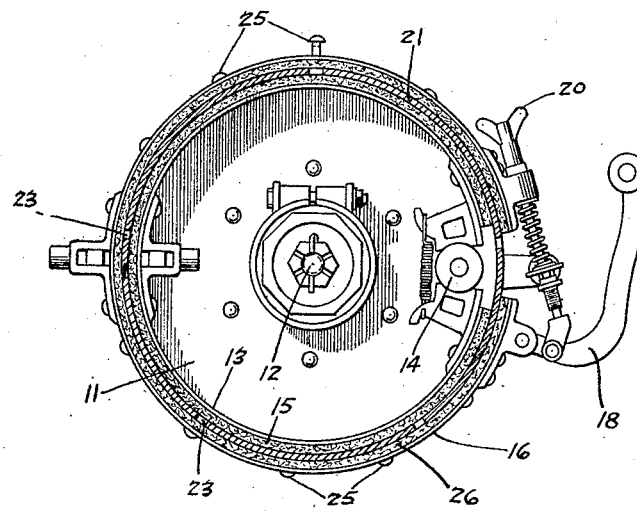
FIG. 4
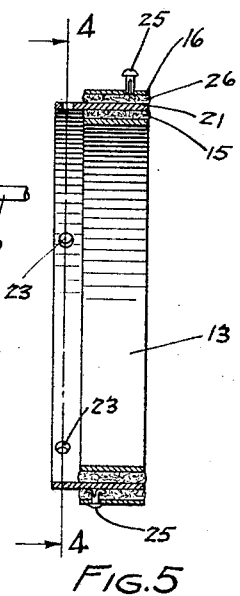
FIG. 5
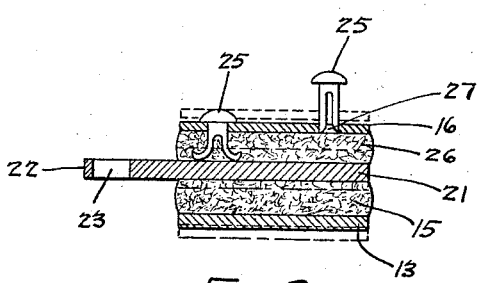
FIG. 6
Inventor
ROBERT SARDESON
By Paul, Paul & Moore
ATTORNEYS April 21, 1925.  R. SARDESON  1,534,083
APPARATUS FOR RELINING MOTOR VEHICLE BRAKE BANDS
Original Filed Nov. 25, 1921   2 Sheets-Sheet 2

Inventor
ROBERT SARDESON
By Paul, Paul + Moore
ATTORNEYS

Patented Apr. 21, 1925.

1,534,083

UNITED STATES PATENT OFFICE.

ROBERT SARDESON, OF MINNEAPOLIS, MINNESOTA.

APPARATUS FOR RELINING MOTOR-VEHICLE BRAKE BANDS.

Original application filed November 25, 1921, Serial No. 517,723, which has matured into Patent No. 1,452,475, dated April 17, 1923. Divided and this application filed August 24, 1922. Serial No. 584,138.

*To all whom it may concern:*

Be it known that I, ROBERT SARDESON, a citizen of the United States, residing at Minneapolis, county of Hennepin, in the State of Minnesota, have invented certain new and useful Improvements in Apparatus for Relining Motor-Vehicle Brake Bands, of which the following is a specification.

This invention relates to new and useful improvements in an apparatus for relining motor vehicle brake-bands. The present method of relining brake-bands is laborious and tedious and involves a relatively high labor charge. In such relining operation as at present effected, the rear axle of the car is jacked up and the rear wheels are removed at which time the brake drums (fixed to the rear wheels) are also removed. The entire brake mechanism is thus exposed. The actuating levers must next be loosened and disconnected and the brake-bands removed. Usually these are caked with mud and grease and the connections are rusted and hard to take apart. Similarly, if the emergency brakes are also to be relined, their brake shoes must be removed in a like manner. The next step is to remove the old or worn brake lining from the band— usually by placing each band in a vise and the old rivets are cut or chiseled away and upon removal of the lining the holes in the band are cleared by a punch. The new lining is then fitted and clamped to the band and the band is used as a template for drilling holes. New rivets are then inserted in the alined band and lining holes and hammered against an anvil or metal surface whereby the rivet ends are flattened. The same method applies for both internal expanding bands such as are employed in practically all cars for emergency brakes and for external contracting bands employed for a service brake.

After relining of the band is effected, the brake-band must be replaced and thereafter the brake mechanism must be re-connected and adjusted and thereafter the rear wheels and brake drums are replaced. The present process consumes a large amount of the mechanic's time and involves a relatively large charge therefor.

By the employment of this novel apparatus, the labor charge is practically cut in half. In practicing this invention in the majority of cases, the rear wheels and brake-drums are removed, the old lining cut away from the brake-band without removal of such band from its mounting. An anvil is then inserted, for example, between the service brake-band and the lined emergency brake-band, the new lining is then inserted between the service brake-band and the anvil and is riveted to the service brake-band. The anvil is then removed and the wheels and brake drum replaced.

The object therefore of this invention is to provide a new and improved apparatus for relining motor vehicle brake-bands.

Other objects of the invention will more fully appear from the following description and the accompanying drawings and will be pointed out in the annexed claims.

In the accompanying drawings there has been disclosed a structure designed to carry out the objects of the invention, but it is to be understood that the invention is not confined to the exact features shown, as various changes may be made within the scope of the claims which follow.

In the drawings:

Figure 1 is a view in side elevation of a form of ring or anvil;

Figure 2 is a vertical section of the ring shown in Figure 1;

Figure 3 is a view in side elevation of a pin employed to facilitate handling of the ring or anvil;

Figure 4 is a view in side elevation of a common form of internal and external brake mechanism after removal of a rear wheel and drum, the novel ring or anvil being here shown in section and in operative position;

Figure 5 is a view in vertical section of the assembled mechanism but with the associated parts shown in Figure 4 omitted;

Figure 6 is an enlarged detail of a portion of the sectional view shown in Figure 5;

Figure 7:
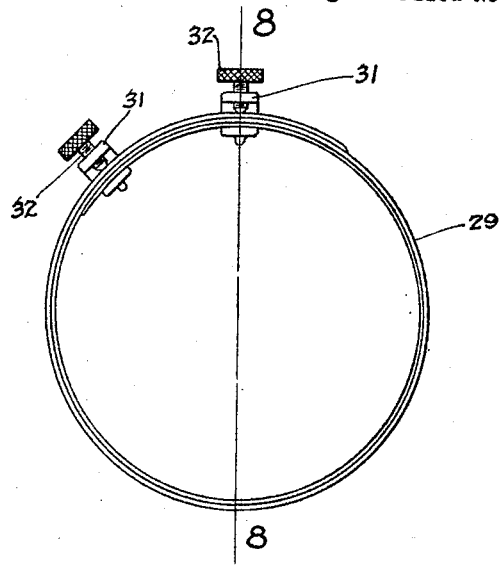
Figure 7 is a view in side elevation of a form of adjustable anvil.

For the purpose of clearness and definiteness in explaining this invention there is shown in the accompanying drawings a common form of brake mechanism, it being preferably shown after removal of a rear wheel and its brake drum in any of the well-known manners. The annular plate 11 is fixed to the rear axle housing as is usual and is stationary with respect thereto. The axle 12 for a rear wheel projects there through in accordance with standard practice. The mounting of the emergency internal expanding brake-band 13 and its connection 14 with an emergency brake rod (not shown) is old so far as the inventor hereof is concerned and is hereby expressly disclaimed. Such brake-band 13 is provided as is common with a lining 15 adapted to be frictionally held against the internal face of the usual brake-drum (not necessary to be shown). Likewise, it is old in this art to provide a service external contracting brake-band 16 having a lining suitably mounted and having a connection 18 with the usual service or foot brake rod 19.

The novel anvil employed consists of a flat ring 21 preferably of substantially rigid metal. This ring is of an effective diameter equal to that of the brake-drum of the rear wheel with which the brakebands in question are associated and is preferably greater in width than the width of the brake-band with which it is adapted to be used. When the closed flat ring 21 is employed, there are provided a plurality or set of such rings of varying diameters to be selectively used in connection with differently sized brake mechanisms of the present various makes of motor vehicles. The portion 22 (see Figure 5) of the ring which may be termed the projecting portion is preferably provided with a plurality of holes 23 therethrough, such holes being disposed adjacent the projecting side of the ring. Such holes 23 are adapted to receive the pin 24 by means of which the ring may be conveniently manipulated.

This novel apparatus is equally applicable to relining either the external brakeband or the internal brake-band. It will be described and explained in connection with the relining of the external brakeband. In the employment of this novel apparatus, the rear wheel and attached brake drum are removed in the usual manner. But the present demounting of the brakeband connections is not carried out. Instead, after removal of the wheel and brake drum, the old rivets which secure the old lining to the brake-band are cut away, as for example, by means of a chisel and hammer and the old lining is then easily removed from the external brake-band. The ring is then inserted between the lining 15 of the internal brake-band 13 and the external brake-band 16 and the pin 24 may, if desired, be inserted in one of two holes 23 of the ring 21 to facilitate handling of the anvil. The new lining, which has been previously cut to proper length, is then inserted between the external brake-band 16 and the ring 21. It is preferable, however, previously to loosen the brake-band adjustment to increase the effective diameter of the brake band. This is conveniently effected by rotating the usual adjusting wing nut 20. After insertion of the new lining, the external brake-band is tightened snugly by any convenient means, the purpose being to hold the brake-lining firmly in place during the next step which consists in securing the new lining to the brake-band. New rivets 25 are then inserted in the usual holes provided in the external brake-band and are inwardly driven through the new lining 26 and, striking against the ring 21, are bent or deflected tightly to grip the new lining and to secure the same to the external brake-band. Preferably, brass rivets of the split type shown in Figures 5 and 6 are employed. In Figure 5, there is shown a rivet 25 about to be driven through the usual hole 27 in the external brake-band 16 and through the new lining 26 against the ring 21 whereby the split ends of the rivet are deflected in both directions as shown on the left in this figure.

The next step, after thus securing the new lining to the brake-band, is to remove the ring 21 from its operative position. This is conveniently done by loosening the brake-band which had been preferably previously tightened. The pin 24 may be employed in the manner above-mentioned to facilitate removal of the anvil. The band is thus ready for replacement of the brake drum and wheel.

Figure 9:
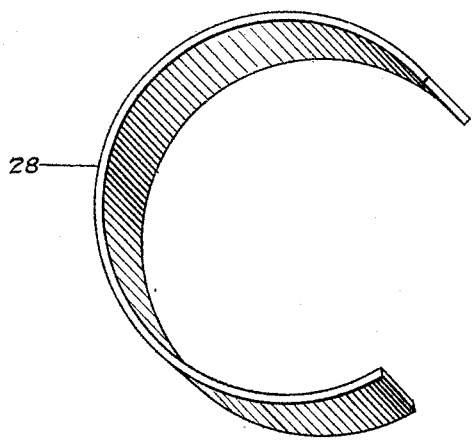
Figure 9 is a perspective view of a modified form of anvil.

An advantageous form of anvil is shown in Figure 9 wherein there is suggested the employment of an arcuately shaped anvil 28 or, otherwise considered, a flat ring having an arcuate portion thereof cut away. Such arcuate anvil may be operatively positioned so that the spaced ends substantially coincide with the spaced ends of the brake-bands. The advantage of this arcuate anvil is that its effective diameter may be readily varied.

Figure 8:
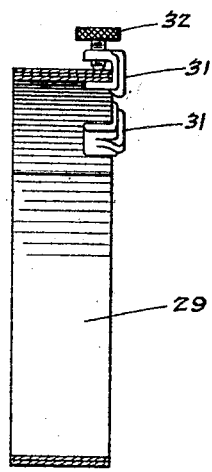
Figure 8 is a view in vertical section on the line 8—8 of Figure 7.

To avoid the necessity, above-noted, of maintaining on hand at a service station or garage a set of different diametered rings, there may be provided an adjustable ring or anvil. Such adjustable anvil 29 is shown in Figures 7 and 8 wherein is illustrated an elongated flat metallic strip shaped to provide a coiled anvil. This anvil is adapted to be held at a selected diameter by means of clamps adapted retentively to hold the two end portions of the coil with relation to each other. Any suitable clamp or small vise may be employed for this purpose. There is here shown a fixed member comprising a U-shaped metallic jaw 31 having an aperture in one portion to receive the binding screw 32 in threaded engagement therein. Rotation of the screw 32 by means of its knurled head causes the end of the screw to clamp the interposed coils of the anvil against the under flange of the jaw 31.

Thus by the employment of this apparatus, the work attendant upon relining brake-bands of motor vehicles is greatly decreased, principally through avoidance of the necessity of demounting and replacement of the brake-bands themselves. These omitted steps are practically the most expensive due to the fact that in the majority of instances the brake mechanism parts are caked with hardened mud and with grease and the connections are rusted binding them tightly together.

I claim as my invention:

1. An apparatus for relining motor vehicle brake-bands of predetermined widths comprising a substantially annular anvil, the anvil being of greater width than the widest brake-band to be relined whereby a portion of the anvil may project beyond the brake-band when the anvil is in operative position, said projecting anvil portion being provided with an aperture, and means adapted to be inserted in said aperture to facilitate handling of the anvil.

2. An apparatus for relining motor vehicle brake-bands comprising an arcuately shaped anvil, the anvil being of such thickness as to permit the anvil to be inserted in the position normally occupied by the brake-drum and also being of greater width than the brake-band to be relined whereby a portion of the anvil may project beyond the brake-band when the anvil is in operative position, and means to facilitate handling of the anvil.

3. An apparatus for relining motor vehicle brake-bands comprising an arcuately shaped anvil, the anvil being of such thickness as to permit the anvil to be inserted in the position normally occupied by the brake-drum and also being of greater width than the brake-band to be relined whereby a portion of the anvil may project beyond the brake-band when the anvil is in operative position, and means adapted demountably to be secured to the anvil to facilitate handling thereof.

4. An apparatus for relining motor vehicle brake-bands comprising an arcuately shaped anvil, the anvil being of such thickness as to permit its insertion in the position normally occupied by the brake-drum and being of greater width than the brake-band to be relined whereby a portion of the anvil may project beyond the brake-band when the anvil is in operative position, and means on said projecting portion to facilitate handling of the anvil.

5. An apparatus for relining motor vehicle brake-bands comprising an arcuately shaped anvil, the anvil being of such thickness as to permit the anvil to be inserted in the position normally occupied by the brake-drum, said anvil having a portion of greater width than the brake-band to be relined whereby said portion of the anvil may project beyond the brake-band when the anvil is in operative position, and means to facilitate handling of the anvil.

In witness whereof, I have hereunto set my hand this 22nd day of August, 1922.

ROBERT SARDESON.